Patented July 14, 1936

2,047,647

UNITED STATES PATENT OFFICE 2,047,647

CUPRIFEROUS AZO DYESTUFFS AND THEIR PRODUCTION

Clifford Paine, Blackley, Manchester, England, assignor to Imperial Chemical Industries Limited, a corporation of Great Britain No Drawing. Application May 23, 1935, Serial No. 23,127. In Great Britain May 23, 1934

5 Claims. (Cl. 260—12)

This invention relates to improvements in azo dyestuffs and more particularly to the manufacture of monoazo metalliferous dyestuffs.

It is an object of the invention to provide monoazo dyestuffs having at the same time both excellent light-fastness and good affinity for cellulose fibres.

Monoazo dyestuffs, including those containing metal complexes and known as metalliferous dyestuffs, have in general relatively poor substantivity for cellulose. For this reason they are not regarded by those skilled in the art as being satisfactory for the direct dyeing of cotton and other cellulose fibres. Various means have been proposed for improving the substantivity of monoazo dyestuffs but, so far as I am aware, these have not resulted in dyestuffs having technical usefulness. It is, for instance, known that the introduction of benzoylamino groups produces some augmentation of substantivity. In British Patent 418,360 it is said that dyestuffs of improved substantivity may be obtained by acylating aromatic hydroxy compounds with aromatic carboxylic acid of the formula R—CH=CHCOOH, in which R is aryl, their esters, halogenides or anhydrides and coupling the acylated products with diazonium compounds. In the above mentioned specification there is described the preparation of monoazo dyestuffs by coupling diazotized metanilic acid with 2-cinnamoylamino-8-naphthol-6-sulphonic acid and by coupling diazotized naphthionic acid with 2-cinnamoylamino-5-naphthol-7-sulphonic acid. The technical utility of the described dyestuffs is, however, considerably lessened by the fact that they have only moderate light-fastness.

I have now found that by treating in aqueous solution with an agent containing copper, for example, copper sulphate, those dyestuffs obtained by coupling a diazo compound having an alkoxy, hydroxy or carboxylic acid group ortho to the diazo group with 2-cinnamoylamino-5-naphthol-7-sulphonic acid or 2-cinnamoylamino-8-naphthol-6-sulphonic acid, new metalliferous dyestuffs having desirable properties are obtained. The new dyestuffs of my invention have the probable formula:—

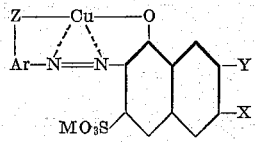

where Ar is arylene, Z is the residue —COO— or —O—, M is hydrogen, alkali metal or ammonium and either X or Y is a cinnamoylamino group (—NHCOCH=CHC$_6$H$_5$) and the other of them is hydrogen.

The new metalliferous dyestuffs have much superior light fastness compared with those of the above mentioned prior art. Further, as could not be expected by reference to the prior art, the new metalliferous dyestuffs have a greater affinity for cotton or other cellulose fibres than the parent azo compounds in which no metallic complex is present. This is so much the case that the new dyestuffs are technically very useful.

Examples of compounds suitable for use as diazo components are the following:— 4-chloro-2-aminophenol-5-sulphonic acid, 6-chloro-2-aminophenol-4-sulphonic acid, 6-nitro-2-aminophenol-4-sulphonic acid, 5-nitro-2-aminobenzoic acid, 3,6-dichloro-2-aminobenzoic acid, 5-sulpho-2-aminobenzoic acid, 2-anisidine, 2,5-diethoxy-aniline, 1-amino-2-methoxy-naphthalene-6-sulphonic acid, 1-amino-2-ethoxynaphthalene and 1-amino-2-naphthol-4-sulphonic acid. The coupling of the diazo component with the second component is carried out in aqueous alkaline medium.

The conversion of the parent dyestuffs into metalliferous dyestuffs containing a copper complex is carried out by known methods. For example, those dyestuffs derived from diazo components having hydroxy or carboxyl groups ortho to the diazonium nitrogen may be reacted with copper sulphate in aqueous solution or with an aqueous cuprammonium solution obtained by dissolving a copper salt in excess of aqueous ammonia. The formation of the copper complex in many cases takes place readily at ordinary temperature but the reaction is preferably accelerated by heating. In those cases where the group ortho to the diazonium nitrogen of the first component is alkoxyl it is desirable to heat the parent dyestuff in aqueous solution at 90–100° C. with a cuprammonium solution until the copper complex of the dyestuff is formed by the splitting off of the alkyl residues from the said alkoxyl group. The copper-complex-forming reaction may be carried out at atmospheric or high pressures.

The following detailed examples, in which the parts are by weight, illustrate but do not limit the invention.

Example 1

22.4 parts of 4-chloro-2-aminophenol-5-sulphonic acid are dissolved in 500 parts of hot water and 12.0 parts of 30% hydrochloric acid. A further 18 parts of 30% hydrochloric acid are then added, the amine solution cooled to 10° C.

and then diazotized with 35 parts of a 20% aqueous solution of sodium nitrite. The resulting solution of diazo compound is then gradually added to an ice-cold solution of 36.9 parts of 2-cinnamoylamino-5-naphthol-7-sulphonic acid in 300 parts of water containing 10.0 parts of anhydrous sodium carbonate and 8.0 parts of caustic soda.

Coupling is rapid and after 2 hours the monoazo dyestuff is isolated by adding common salt followed by filtration. The azo compound is then re-dissolved in 600 parts of hot water, the solution made slightly acid to litmus by the addition of acetic acid and then 25.5 parts of crystalline copper sulphate are added. The mixture is heated and stirred at 95° C. for 1 hour when 20 parts of anhydrous sodium carbonate are added and, after heating at 90-95° C. for a further 20 minutes, the copper-containing dyestuff is salted out and filtered off. It is dried and then forms a violet black powder.

The new dyestuff dyes cotton from an alkaline bath in blue-violet shades which have excellent fastness to light. It also gives excellent level dyeing on uneven quality viscose. In both fastness to light and affinity for cotton the new dyestuff is superior to the parent dyestuff which is free from copper.

*Example 2*

65.2 parts of the dyestuff, prepared by combining 6 - chloro-2-aminophenol-4-sulphonic acid with 2-cinnamoylamino-7-naphthol-7-sulphonic acid in the manner described in Example 1, are dissolved in 600 parts of hot water. The solution is made just acid to litmus by addition of hydrochloric acid and then just alkaline to litmus by the addition of aqueous ammonia. To the alkaline solution is added a solution of 25 parts of crystalline copper sulphate in 50 parts water and 32 parts of 30% aqueous ammonia. The mixture is then heated under reflux for 1 hour at 95-100° C.

At the expiration of this time, 25 parts of anhydrous sodium carbonate are added to the reaction mixture and heating continued for a further half hour when the dyestuff is salted out and filtered.

The new dyestuff dyes cotton and viscose from an alkaline bath in red-violet shades of excellent light-fastness.

*Example 3*

By using 13.7 parts of anthranilic acid instead of the 22.4 parts of 4-chloro-2-amino-phenol-5-sulphonic acid of Example 1 a new copper-containing dyestuff is obtained which dyes cotton in brown-orange shades of excellent fastness to light.

*Example 4*

18.2 parts of 5-nitro-2-aminobenzoic acid are diazotized in the usual way and added gradually to a stirred ice-cold solution of 39.1 parts of the sodium salt of 2-cinnamoylamino-8-naphthol-6-sulphonic acid in 300 parts of water containing sufficient sodium carbonate to keep the coupling mixture always alkaline to litmus paper. When coupling is complete the coupling mixture is made slightly acid to litmus with acetic acid and a solution of 25 parts of copper sulphate crystals in 100 parts water is added. The mixture is heated for 1 hour at 90-100° C. and the new copper-containing dyestuff is salted out and filtered off.

The new dyestuff dyes cotton and viscose artificial silk from an alkaline bath in brown shades of excellent light fastness.

By replacing the sodium salt of 2-cinnamoylamino-8-naphthol-6-sulphonic acid in the above example by an equal weight of the sodium salt of 2-cinnamoylamino-5-naphthol - 7 - sulphonic acid a copper-containing dyestuff is obtained which dyes cotton in Bordeaux shades of excellent light-fastness and of superior fastness to washing compared with the parent copper-free dyestuff.

I claim:—

1. Process for the manufacture of metalliferous dyestuffs comprising reacting dyestuffs of the general formula

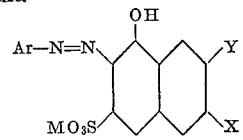

where Ar is arylene carrying an alkoxy, hydroxy or carboxylic group in the ortho position to the azo nitrogen, M is hydrogen, alkali metal or ammonium and either X or Y is a cinnamoylamino group (—NHCOCH=CH₆H₅) and the other of them is hydrogen, in aqueous medium with an agent containing copper.

2. Process for the manufacture of copper-containing dyestuffs of the general formula:—

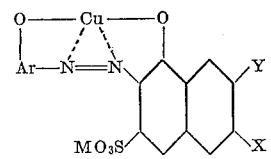

where Ar is arylene, M is hydrogen, alkali metal or ammonium and either X or Y is a cinnamoylamino group and the other of them is hydrogen, comprising reacting an aqueous solution of a copper yielding compound with a dyestuff obtained by coupling a diazotized aromatic ortho aminohydroxyl compound with one of a group consisting of 2-cinnamoylamino-5-naphthol-7-sulphonic and 2-cinnamoylamino-8-naphthol-6-sulphonic acid.

3. Process for the manufacture of copper-containing dyestuffs of the general formula:—

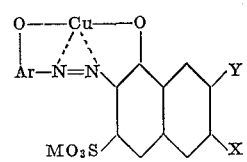

where Ar is arylene, M is hydrogen, alkali metal or ammonium and either X or Y is a cinnamoylamino group and the other of them is hydrogen, comprising reacting a hot aqueous cuprammonium solution with a dyestuff obtained by coupling an aromatic ortho aminoalkoxy compound with one of a group, consisting of 2-cinnamoylamino-5-naphthol-7-sulphonic and 2-cinnamoylamino-8-naphthol-6-sulphonic acid.

4. Process for the manufacture of copper-containing dyestuffs of the general formula:—

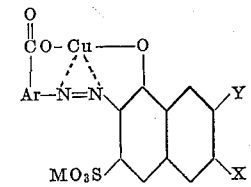

where Ar is arylene, M is hydrogen, alkali metal or ammonium and either X or Y is a cinnamoylamino group and the other of them is hydrogen, comprising reacting an aqueous solution of a copper yielding compound with a dyestuff obtained by coupling a diazotized aromatic ortho aminocarboxylic acid with one of a group consisting of 2-cinnamoylamino-5-naphthol-7-sulphonic acid or 2-cinnamoylamino-8-naphthol-6-sulphonic acid.

5. Copper-containing dyestuffs of the general formula:—

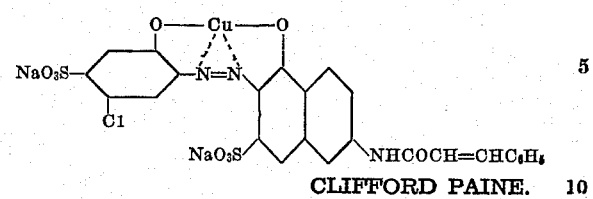

CLIFFORD PAINE.